United States Patent [19]

MacDonald

[11] Patent Number: 4,587,108

[45] Date of Patent: May 6, 1986

[54] FLOCCULATION OF ACID LEACH SLURRIES

[75] Inventor: Alister R. F. MacDonald, Rand Park Ridge, South Africa

[73] Assignee: Allied Colloids Limited, England

[21] Appl. No.: 538,703

[22] Filed: Oct. 3, 1983

[30] Foreign Application Priority Data

Oct. 7, 1982 [GB] United Kingdom ............... 8228755

[51] Int. Cl.$^4$ .................... C01G 56/00; C01G 57/00
[52] U.S. Cl. .................................... 423/11; 423/18; 252/175; 252/180; 210/728; 210/734
[58] Field of Search ............... 423/3, 7, 18, 20, 253; 525/212, 218; 252/175, 180; 210/728, 734

[56] References Cited

U.S. PATENT DOCUMENTS

| | | | |
|---|---|---|---|
| 3,692,673 | 9/1972 | Hoke | 210/728 |
| 4,317,759 | 3/1982 | Kanda et al. | 524/93 |
| 4,342,653 | 8/1982 | Halverson | 210/734 |

*Primary Examiner*—Paul Lieberman
*Assistant Examiner*—Hoa Van Le
*Attorney, Agent, or Firm*—Lawrence Rosen

[57] ABSTRACT

The rate of separation of insoluble material from an acid-leached uranium slurry is improved by adding a flocculating agent that is a combination of polyacrylamide and a copolymer of acrylamide with 2-acrylamide-2-methylpropanesulphonic acid or a water soluble salt thereof with acrylamide.

12 Claims, No Drawings

FLOCCULATION OF ACID LEACH SLURRIES

In the acid-leaching of uranium ores the uranium present is converted into soluble compounds. Usually nitric acid or sulphuric acid is used. The resulting slurry has insoluble material in it and this must be removed before the uranium liquor can be processed. It is common practice to add a flocculating agent to the slurry to improve the rate of separation. Separation is often by sedimentation but can be other means, for instance filtration. Various flocculating agents have been used including, for instance, natural materials such as guar gum and synthetic polymers, especially polyacrylamide. A wide variety of synthetic polymeric materials have been proposed as flocculating agents for a wide variety of slurries but acid-leach uranium slurries have particular properties that result in most flocculating agents being unsatisfactory. Although polyacrylamide often gives an adequate rate of separation, it would be very desirable to improve this rate.

It has been proposed in the literature to use various other synthetic polymers, and in particular certain copolymers, as flocculants for acid-leached uranium slurries. For example in U.S. Pat. No. 3,617,573, the use is described in such liquors of copolymers of acrylamide and sulphoalkylacrylates. In U.S. Pat. No. 4,342,653, it is proposed to use certain copolymers of 2-acrylamido-2-methylpropanesulphonic acid or a water soluble salt thereof (hereinafter referred to as AMS) with acrylamide as flocculating agents for various slurries and 2 of the 45 examples do illustrate the use of certain copolymers of this type on acid-leached uranium slurries, and also demonstrate the use of polyacrylamide on such slurries.

We have now surprisingly found that it is possible to obtain a significant improvement in the rate of separation if the flocculating agent comprises a combination polyacrylamide and a copolymer of acrylamide with AMS.

The amount of each component in the combination is at least 5% by weight of the combination and is such that the rate of separation is greater than the rate of separation that is obtained using either component alone in an amount equal to the amount of the combination. In the invention it is possible to obtain substantial improvements in the rate of separation. For instance, it is easily possible to obtain a rate of separation that is at least 1.2 times, generally at least 1.5 times and frequently at least 2 times, for instance 2 to 4 times, the rate of separation obtainable using either component alone in an amount equal to the amount of the combination. For instance if the combination, per unit volume of slurry, consists of 10 grams copolymer and 10 grams polyacrylamide, the rate of separation obtainable when using 20 grams of this combination is compared with the rate of separation obtained when using 20 grams of identical polyacrylamide or 20 grams of the identical copolymer.

By the invention it is possible to obtain flocculation results that are not only improved, in an absolute sense, compared to those obtainable using conventional flocculants but are also improved when measured on a cost effective basis.

The proportion of AMS in the copolymer generally is at least 10% and most preferably at least 25% by weight of the copolymer. Generally it is not more than 90% and preferably is not more than 75%. Often it is 15 to 16% and best results are generally obtained when it is from 40 to 65%. These percentages are by weight based on the weight for AMS and acrylamide in the copolymer. If desired the copolymer can additionally include other copolymerisable comonomers, generally acrylic comonomers, provided they do not detrimentally affect the flocculating properties. They are generally present in amounts, based on AMS+acrylamide, of not more than 20%, and usually not more than 10% by weight.

The amount of the copolymer, by weight based on the weight of the combination of copolymer and polyacrylamide, is generally at least 5% and sometimes at least 20%. Generally the amount is below 95% and usually below 80%. Although good results are obtainable throughout these ranges, and in particular optimum results are sometimes obtained with amounts of from 50 to 75%, it has been observed that some of the best results are obtainable with amounts of below 50% generally 5 to 50%.

The optimum proportions of the copolymer and the polyacrylamide will depend partly upon the amount of AMS in the copolymer and partly the particular slurry being treated. Naturally, therefore, the proportions of the components and the proportions of the monomers from which the copolymer was used are selected such that the desired improvement in the rate of separation is obtained.

When the copolymer contains from 15 to 39% by weight AMS, the amount of copolymer in the combination is preferably from 20 to 60%, and when the copolymer contains from 40 to 65% AMS the amount of copolymer in the combination is preferably from 40 to 85%. Particularly good results are obtained when the copolymer contains from 18 to 30%, preferably 20 to 25%, AMS and the combination contains 20 to 60%, preferably 25 to 50% by weight of the copolymer and when the copolymer contains from 45 to 65%, preferably 50 to 60% AMS and the combination contains 40 to 80%, preferably 50 to 80%, of the copolymer.

The invention includes not only the process but also the novel compositions comprising a blend of the polyacrylamide and the copolymer, especially in the preferred amounts quoted above.

The process of the invention may be carried out in conventional manner, apart from the use of the combined flocculating agent. Thus the flocculating agent can be added in conventional manner and the separation performed in conventional manner. The invention is of particular value when the separation is conducted by sedimentation but is also applicable when separation is by, for instance filtration.

The combined flocculating agent is added to the acidic slurry in an effective amount and the optimum for this can be determined by routine experimentation. Generally the amount is between 10 and 100 g/t (grams polymer per tonne insoluble material in the slurry, the polymer and the insoluble being weighed on a dry basis). Although the most effective flocculating results are often observed at the higher dosage levels, it may be unnecessary to dose the combination into the slurry at these levels and dosages of 10 to 20 g/t may therefore be preferred. Sometimes such an addition is made followed by one or more subsequent additions of a similar amount.

The combination may be formulated initially as a blend and the blended flocculating agent added to the liquor in one or more doses, as described above. However improved results are obtained when the copolymer and the polyacrylamide are added to the slurry sequentially, with the best results being obtained when the copolymer is added before the polyacrylamide. For instance, a chosen amount of the copolymer, typically 10 to 20 g/t, may be added followed by the appropriate amount of polyacrylamide.

The molecular weight of each of the polymers is generally above 500,000 and preferably is above 1 million. The polymers may be made in conventional manner. For instance, the production of the copolymer may be as described in U.S. Pat. No. 3,692,673. Although the polyacrylamide is primarily a homopolymer, its normal commercial synthesis often results in it containing 1 or 2% or other small amounts of comonomer such as acrylic acid. Comonomers in small amounts, at most 10% by weight, can be tolerated provided they do not detrimentally affect the flocculating properties.

The following are examples of the invention.

EXAMPLE 1

A typical uranium leach slurry was prepared from a concentrated one slurry sample. Concentrated feed (s.g. 1.6, solids density 2.7 g/cm$^3$) was diluted with typical process water to give a final slurry s.g. 1.16, 254 g dry solids per dm$^3$. MnO$_2$ was added as pyrolusite at a level of 3.5 g MnO$_2$ per kg. dry solids. 98% sulphuric acid was added to a level of 20 g/kg dry solids and the slurry was leached overnight at 40° C. with sufficient stirring to prevent the sands content from settling out.

The slurry was sampled into 500 cc stoppered measuring cylinders and treated with 0.05% w/v polymer solutions at 40° C. For each test, the cylinder was removed from the water bath and vigorously shaken. The polymer dose required was immediately syringed into the slurry and the cylinder slowly inverted three times. The mud line which formed was timed over a 5 cm fall in the free settling region and the initial sedimentation rate (ISR) calculated.

The process was repeated using varying dosages of varying blends of three different copolymers, A, B and C, with different amounts of polyacrylamide. Each of the copolymers is a copolymer of AMS, as the sodium salt, and acrylamide. In copolymer A the amount of AMS is 22%, in B it is 58% and in C it is 73%.

The ISRs of the various blends are given in Table 1 (m/hr).

TABLE 1

| Copolymer A | | Copolymer B | | | Copolymer C | | |
|---|---|---|---|---|---|---|---|
| % copol | 84.4 g/t | % copol | 37–43 g/t | 84.4 g/t | % copol | 55 g/t | 84.4 g/t |
| 0 | 15.0 | 0 | 6.1 | 15.0 | 0 | 7.8 | 15.0 |
| 25 | 41.2 | 30 | 7.8 | 23.0 | 25 | 10.9 | 21.5 |
| 50 | 30.9 | 50 | 10.5 | 56 | 50 | 6.9 | 15.0 |
| 75 | 5.1 | 65 | — | 67 | 75 | 5.8 | 20.6 |
| 100 | 4.4 | 80 | 12.0 | 40 | 100 | 5.3 | 4.8 |
| | | 100 | 8.2 | 33 | | | |

EXAMPLE 2

A uranium acid leach liquor obtained from a plant in South Africa was subjected to a belt filter simulation test (Buchner Funnel). The filtration rate of the primary filtrate was measured with various additions of flocculants. The results are given in Table 2. Copol is a copolymer of 54% AMS with 46% acrylamide. PAM is polyacrylamide.

TABLE 2

| | FILTRATION RATE ml/sec | | |
|---|---|---|---|
| Dosage g/t | 100% copol | 50% copol + 50% PAM | 25% copol + 75% PAM |
| 0 | 0.37 | 0.37 | 0.37 |
| 33.3 | 1.44 | 1.5 | 1.8 |
| 50 | 1.97 | 2.1 | 2.7 |
| 66.7 | 1.97 | 2.1 | 3.1 |

I claim:

1. A process in which insoluble material is separated from an acid-leached uranium slurry in the presence of an effective amount of a flocculating agent that improves the rate of separation and in which the flocculating agent comprises a combination of polyacrylamide and a copolymer of acrylamide with 10 to 90% by weight 2-acrylamide-2-methylpropanesulphonic acid or a water soluble salt thereof (AMS) and in which the copolymer is present in amount of 20 to 85% by weight of the combination and that is such that the rate of separation is greater than the rate of separation that is obtained using either component alone in an amount equal to the amount of the combination.

2. A process according to claim 1 in which the amount of copolymer is from 20 to 80% by weight of the combination.

3. A process according to claim 1 in which the copolymer is formed from 15 to 65% by weight AMS, the balance being acrylamide.

4. A process according to claim 1 in which the copolymer is formed from 40 to 65% by weight AMS, the balance being acrylamide.

5. A process according to claim 1 in which the copolymer is formed from 15 to 39% by weight AMS, with the balance acrylamide, and the combination contains from 20 to 60% by weight of the copolymer.

6. A process according to claim 1 in which the copolymer is formed from 50 to 60% AMS and the combination contains 50 to 80% by weight of the copolymer.

7. A process according to claim 1 in which the copolymer contains from 20 to 25% by weight AMS and the combination contains from 25 to 50% by weight of the copolymer.

8. A process according to claim 1 in which the amount of the flocculating agent is from 10 to 100 g/t.

9. A process according to claim 1 in which the combination is incorporated in the slurry by adding from 10 to 20 g/t of the copolymer followed by the required amount of polyacrylamide.

10. A process according to claim 1 in which the copolymer is formed from 40 to 65% by weight AMS, with the balance acrylamide, and the combination contains 40 to 85% by weight of the copolymer.

11. A process according to claim 1 in which the rate of separation of the combination is at least 1.2 times the rate of separation that is obtained using either components alone in an amount equal to the amount of the combination.

12. A process as claimed in claim 11 in which the rate of separation of the combination is at least 1.5 times the rate of separation obtainable using either components alone in an amount equal to the amount of the combination.

* * * * *